United States Patent

Pham et al.

[11] Patent Number: 5,599,070
[45] Date of Patent: Feb. 4, 1997

[54] SEAT AND INTEGRAL SEAT BELT

[75] Inventors: Tu T. Pham, Troy; Lawrence J. Verellen, Washington; Gregory A. Wysocki, Sterling Heights, all of Mich.

[73] Assignee: TRW Vehicle Safety Systems Inc., Lyndhurst, Ohio

[21] Appl. No.: 571,129

[22] Filed: Dec. 12, 1995

[51] Int. Cl.⁶ .......................... B60R 22/00; B60R 22/06
[52] U.S. Cl. ........................................... 297/483; 280/808
[58] Field of Search .................................. 297/483, 473, 297/468; 280/801.1, 801.2, 808 X

[56] References Cited

U.S. PATENT DOCUMENTS

| | | |
|---|---|---|
| 3,471,197 | 10/1969 | Ely . |
| 3,877,748 | 4/1975 | Eggert . |
| 4,159,120 | 6/1979 | Fohl . |
| 4,549,749 | 10/1985 | Thomas . |
| 4,718,696 | 1/1988 | Koide et al. ............................. 297/483 |
| 4,804,226 | 2/1989 | Schmale . |
| 5,022,677 | 6/1991 | Barbiero ................................. 297/483 |
| 5,088,794 | 2/1992 | Iwami et al. . |
| 5,253,924 | 10/1993 | Glance . |
| 5,328,249 | 7/1994 | Ball ......................................... 297/483 |
| 5,364,170 | 11/1994 | West . |
| 5,390,982 | 2/1995 | Johnson et al. ........................ 297/483 |
| 5,441,332 | 8/1995 | Verellen . |

FOREIGN PATENT DOCUMENTS

| | | | |
|---|---|---|---|
| 3613830 | 10/1987 | Germany ................................. | 280/808 |
| 91022177 | 8/1991 | Germany . | |
| 4285506 | 10/1992 | Japan ..................................... | 297/483 |

OTHER PUBLICATIONS

Brochure page entitled "LSSC Safety Seat".
Article entitled "BMW Seat Concept with Seat Integrated Belt System", pp. 1–8.

Primary Examiner—Peter M. Cuomo
Assistant Examiner—Anthony D. Barfield
Attorney, Agent, or Firm—Tarolli, Sundheim, Covell, Tummino & Szabo

[57] ABSTRACT

A seat (20) includes a frame (22) with a first frame portion (26) supporting a seat bottom (40) and a second frame portion (24) supporting a seat back (42) and attached at two places (28) to the first frame portion to define a reference axis (A). Seat belt webbing (62) carries a tongue (64) and has an end (82) fixed to the first frame portion (24). A retractor (84) is fixed to the frame (22) and another end of the seat belt webbing is operably connected with the retractor. A buckle (80) is fixed to the first frame portion (26) of the seat (20) to receive the tongue (64). A guide (100) extends through the seat back for guiding movement of the seat belt webbing (62) through the seat back (42). A turning mechanism (120, 120a) directs the seat belt webbing (62) and comprises a housing (122, 122a) fixed to a part (118, 118a) of the second frame portion (24). A support portion (182) includes a support surface (225) and has a snap attachment for attaching to the housing (122, 122a). A bezel (184) is received in the support portion (182) and has a slot (260) through which the seat belt webbing (62) extends. The bezel (184) is supported by the housing (122) for rotation relative the reference axis (A). A cover (186) is snap attached to the support portion (182) to retain the bezel (184) on the support surface (225). A member (140) is supported by the housing (122) at an angle relative to the reference axis (A) and has a curved surface (142) for directing the seat belt webbing (62) from the guide (100) toward the bezel (184). A majority of the member (140) is spaced from the reference axis (A) a distance greater than a distance that a majority of the slot (260) of the bezel (184) is spaced from the reference axis.

20 Claims, 5 Drawing Sheets

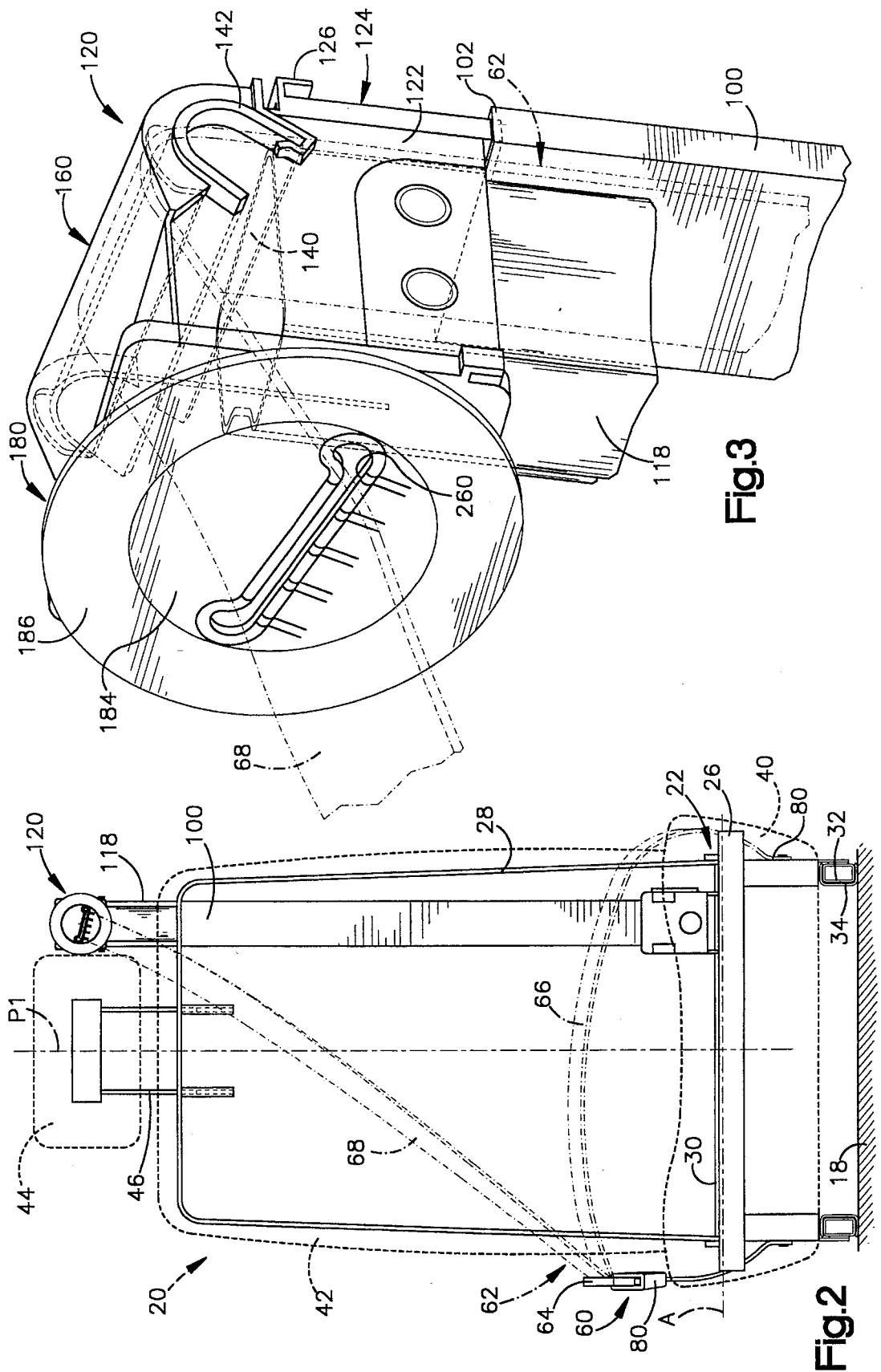

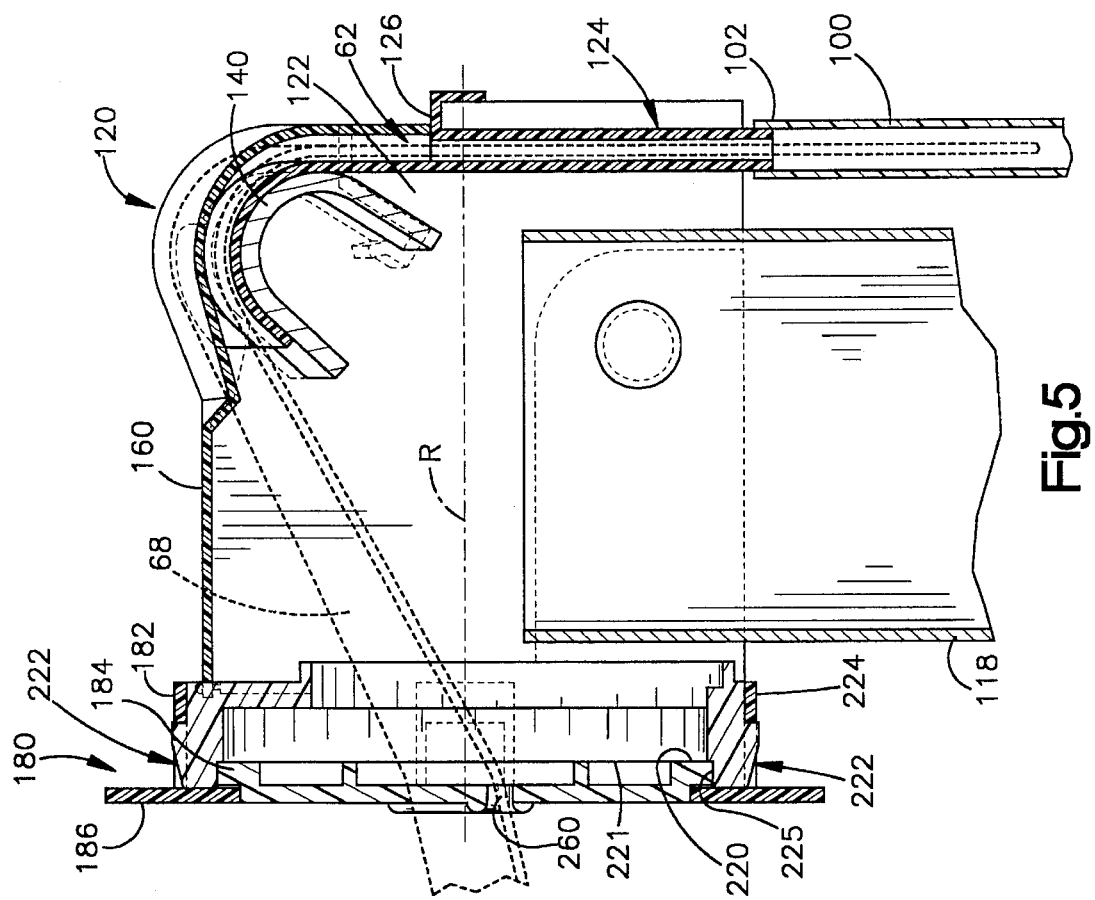
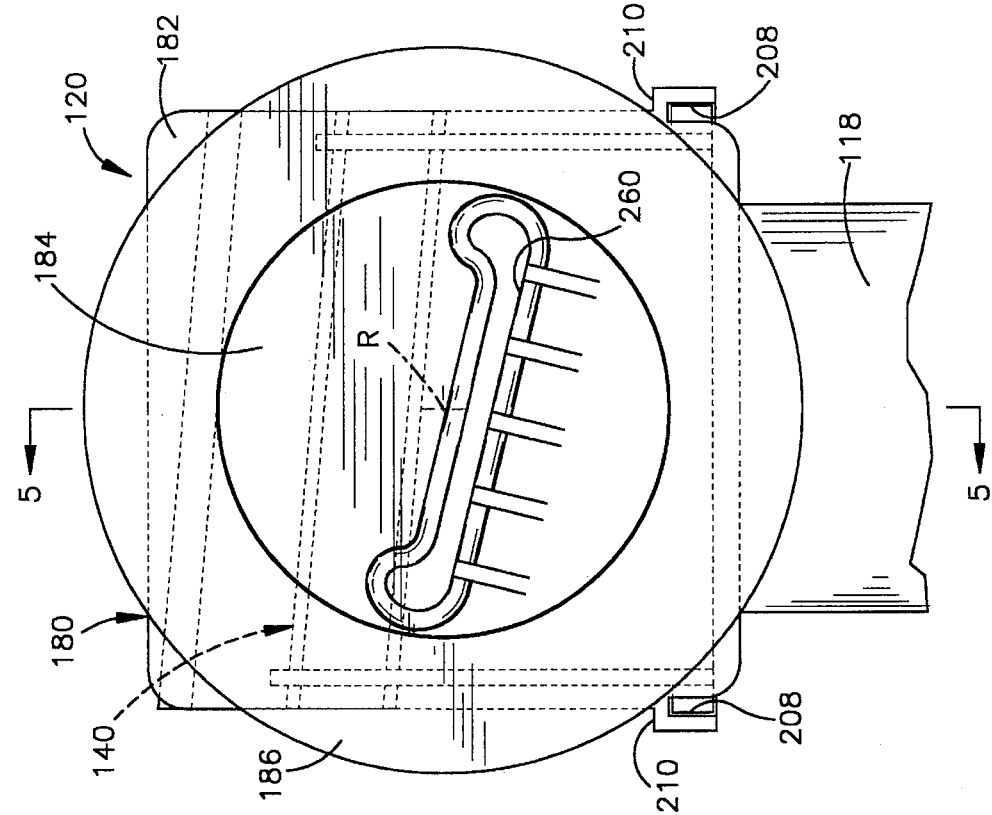

5,599,070

SEAT AND INTEGRAL SEAT BELT

BACKGROUND OF THE INVENTION

1. Technical Field

The present invention relates to a vehicle seat, and particularly to a vehicle seat which includes an integral seat belt system.

2. Description of the Prior Art

Vehicle seats which include integral seat belt systems are known. One such seat includes a retractor for the seat belt system. The retractor is located in a seat back and is attached to an upper portion of a frame for the seat back. A length of seat belt webbing extends from the retractor, through the seat back, through the top of the seat back and from a headrest support member or a member adjacent the headrest. The seat belt webbing extends from the headrest support or the member adjacent the headrest across a torso of an occupant of the seat. The seat belt system restrains movement of an occupant relative to the seat during sudden deceleration of the vehicle, such as occurs in a vehicle collision.

The vehicle seat may be occupied by vehicle occupants having different torso sizes, such as height, width and/or girth. The occupant often adjusts the position of the seat belt webbing to extend across a predetermined location of the occupant's torso to suit the occupant's comfort. Depending on the comfort preferences and/or the torso size of the occupant, the predetermined location may vary for different occupants. It is desirable for the seat belt system to accommodate a change in the predetermined location at which a portion of the seat belt webbing extends across the torso of the occupant with smooth turns in the seat belt webbing.

SUMMARY OF THE INVENTION

The present invention is directed to a vehicle seat which includes an integral seat belt system. The seat and integral seat belt system of the present invention provide advantages to a vehicle manufacturer by reducing vehicle assembly operations and attendant costs. This is accomplished by enabling the seat belt system to be installed in a vehicle concurrently with the seat. The seat and integral seat belt system includes structure for smoothly turning the seat belt webbing as it is directed across an occupant of the seat.

The seat includes a frame with a first frame portion supporting a seat bottom. The frame also includes a second frame portion which supports a seat back and is attached at two frame attachment places to the first frame portion. A reference axis extends through the two frame attachment places. The seat is bisected by a plane extending longitudinally through the seat bottom. The seat belt system includes seat belt webbing having an end fixed to the first frame portion on a first side of the bisecting plane. A retractor is fixed to one of the first and second frame portions on the first side of the bisecting plane. Another end of the seat belt webbing is operably connected with the retractor. The seat belt webbing can be withdrawn from or retracted onto the retractor. A tongue is carried by a portion of the seat belt webbing between the ends. A buckle is fixed to one of the first and second frame portions on a second side of the bisecting plane. The buckle receives and connects with the tongue after the portion of the seat belt webbing which carries the tongue is extended across the seat to the second side of the bisecting plane.

Guide means is located in the seat back and has a first end located adjacent the retractor. The guide means extends through the seat back to guide movement of the seat belt webbing through the seat back. A turning mechanism directs the portion of the seat belt webbing from the guide means in a direction toward the buckle. The turning mechanism includes a housing which is fixed to a part of the second frame portion at a location adjacent a second end of the guide means. The housing includes a support for receiving and supporting a bezel for rotation relative to the housing and the reference axis. The bezel has a slot through which the seat belt webbing extends to direct the seat belt webbing smoothly toward the buckle. A cover is attached to the support to retain the bezel in the support. A member is supported by the housing and has a curved surface to direct the seat belt webbing smoothly from the guide means in a direction toward the slot in the bezel. The curved surface of the member extends at an angle relative to the reference axis.

The support is connected to the housing by a snap attachment. The cover is connected to the support by another snap attachment. The second end portion of the guide means is attached to the housing of the turning mechanism. The guide means comprises a sheath enclosing a portion of the seat belt webbing which extends between the seat belt retractor and the turning mechanism. The rotational position of the bezel is variable relative to the reference axis.

BRIEF DESCRIPTION OF THE DRAWINGS

Further features and advantages of the present invention will become apparent to those skilled in the art to which the present invention relates from reading the following specification with reference to the accompanying drawings, in which:

FIG. 2 is a front view of the seat and integral seat belt system of FIG. 1;

FIG. 3 is an enlarged perspective view of a turning mechanism of the integral seat belt system of FIG. 1;

FIG. 4 is an enlarged front view of the turning mechanism of FIG. 3;

FIG. 5 is an enlarged sectional view of the turning mechanism of FIG. 4, taken approximately along line 5—5 in FIG. 4;

DESCRIPTION OF PREFERRED EMBODIMENTS

Figure 1:
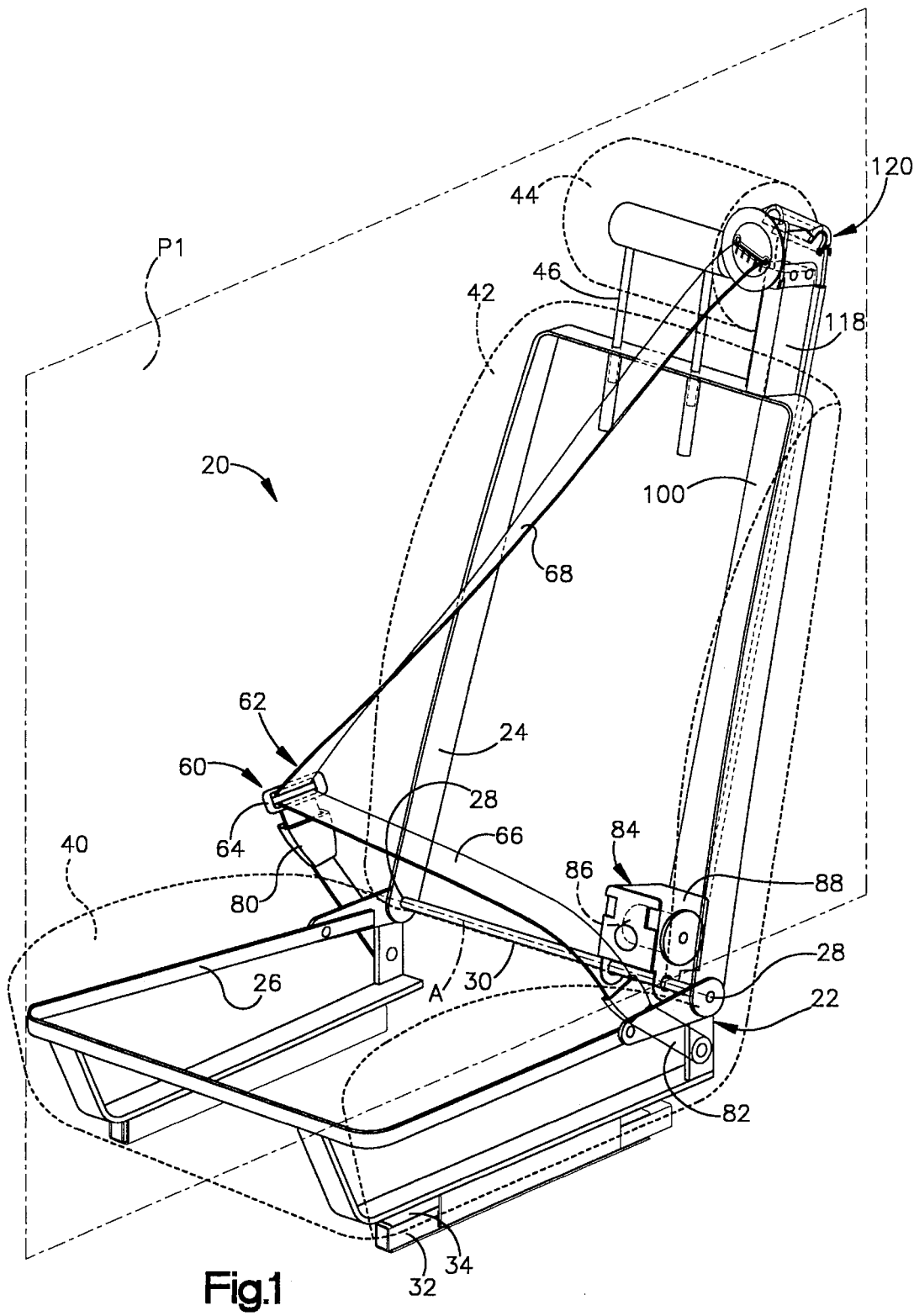
FIG. 1 is a schematic perspective view of a vehicle seat including an integral seat belt system.

A seat 20 is illustrated in FIGS. 1 and 2 for supporting an occupant of a vehicle. The seat 20 includes a frame 22 which is attachable to a part, such as a floor 18 (FIG. 2) of the vehicle. Preferably the frame 22 is made from metal. An upper portion 24 of the frame 22 joins a lower portion 26 of the frame at two connection locations 28.

A reference axis A extends centrally through a shaft 30 which extends between the two connection locations 28. The reference axis A extends horizontally during normal operation of the vehicle on a flat and level surface. The lower portion 26 of the frame 22 of the seat 20 includes slide rails 32 which allow a change in the position of the seat 20 relative to a slide frame 34 fixed to the vehicle floor 18. The seat 20 may also optionally include structure that permits the upper portion 24 of the frame 22 to pivot relative to the lower portion 26 of the frame about the reference axis A.

The seat 20 includes a seat bottom 40 which is supported by the lower portion 26 of the frame 22. A seat back 42 is supported by the upper portion 24 of the frame 22. A headrest 44 is supported by a frame portion 46 which is connected to the upper portion 24 of the frame 22. The position of the headrest 44 relative to the upper portion 24 of the frame 22 is adjustable in a direction toward and away from the seat back 42. The seat bottom 40, the seat back 42 and the headrest 44 are bisected by a plane P1 extending longitudinally through the front and rear of the seat 20.

The seat 20 also includes an integral three point seat belt system 60. Thus, the seat belt system 60 can be installed in a vehicle when the seat 20 is installed and without any additional assembly or attachment operations. The seat belt system 60 includes a continuous length of seat belt webbing 62. The belt webbing 62 carries a tongue 64 between ends of the seat belt webbing which is relatively movable along the length of the belt webbing.

A seat belt webbing retractor 84 is incorporated in the seat belt system 60 for use in restraining an occupant of a vehicle. During operation of the vehicle, an occupant of the vehicle sits on the seat 20 which is illustrated as a driver's seat in the vehicle. The belt webbing 62 is extensible about the vehicle occupant. One end of the belt webbing 62 is connected at an anchor 82 to the lower portion 26 of the frame 22 and inside the seat back 42 on one side of the seat 20 and the bisecting plane P1. The opposite end of the belt webbing 62 is attached to the retractor 84 which is supported in a frame 88 that is secured to the shaft 30 of the frame 22 on the same side of the seat 20. Intermediate its ends, the belt webbing 62 passes through a turning mechanism 120 located at an upper end of the seat 20, above the retractor 84 and the anchor 80. When the seat belt system 60 is not in use, the belt webbing 62 is wound on a spool 86 of the retractor 84 and extends generally vertical along the one side of the seat 20.

To engage the seat belt system 60, the tongue 64 is manually grasped and is pulled across the lap and torso of the occupant sitting in the seat 20. As the tongue 64 is pulled across the lap and torso of the occupant, the tongue may move along the belt webbing 62, and the belt webbing is unwound from the retractor 84. When the belt webbing 62 has been pulled across the lap and torso of the occupant to another side of the seat 20 and the bisecting plane P1, the tongue 64 is connected with a buckle 80, as shown in FIG. 1. The buckle 80 is connected to the lower portion 26 of the frame 22 and is disposed on the side of the seat 20 opposite the anchor 82. When the seat belt system 60 is thus engaged and buckled, the belt webbing 62 is divided by the tongue 64 into a torso portion 68 which extends across the torso of the occupant and a lap portion 66 which extends across the lap of the occupant.

The torso portion 68 of the belt webbing 62 extends upward from the spool 86 of the retractor 84 and through the seat back 42. A sheath 100 guides the belt webbing 62 through the seat back 42. The sheath 100 extends through the seat back 42 from the retractor 84 and to a location adjacent the headrest 44. The sheath 100 is tubular and has a rectangular cross-section, in a plane extending normal to the longitudinal extent of the sheath. The interior cross-section of the sheath 100 is slightly larger than the exterior cross-section of the belt webbing 62. The sheath 100 is made from a material, such as plastic, that has a relatively low coefficient of friction. The belt webbing 62 thus may freely slide in opposite directions inside of the sheath 100. The sheath 100 assures that the belt webbing 62 does not bind in the seat back 42 or is not interfered with as it extends upward from the seat back.

The seat belt system 60 includes a turning mechanism 120 (FIGS. 1–5) located adjacent the headrest 44. The turning mechanism 120 is attached to a post 118. The post 118 is part of the upper portion 24 of the frame 22 and extends upward, as viewed in FIGS. 1–2, through the top of the seat back 42 at a location distal to the reference axis A.

The turning mechanism 120 includes a stamped metal housing 122 and a plastic web guide 124. The housing 122 is fastened to the upper end, as viewed in FIGS. 1–5, of the post 118. The web guide 124 includes a catch 126 (FIG. 5) and a sleeve 128. The catch 126 partially mounts and retains the web guide 124 on the housing 122.

The sheath 100 extends through the top of the seat back 42 and ends at a location near the top of the post 118, as viewed in FIGS. 3 and 5. The sleeve 128 of the web guide 124 has an end that is attached to and encircled by an upper end portion 102 of the sheath 100. As illustrated in FIGS. 3 and 5, the sheath 100 cooperates with the web guide 124 of the turning mechanism 120 to assure that the belt webbing 62 is guided and protected over the entire distance from the retractor 84 to the turning mechanism. Thus, the belt webbing 62 is guided and protected from being contacted or interfered with as it extends throughout the seat back 42 by the sheath 100. The belt webbing 62 is also protected from being contacted or interfered with as it extends from the top of the seat back 42 and before it reaches the turning mechanism 120.

The turning mechanism 120 also includes a turning member 140 (FIGS. 3–6) supported by the housing 122. The turning member 140 is preferably made from a metal, such as steel. The turning member 140 has sufficient strength to withstand the forces transmitted through the belt webbing 62 during normal movement of the belt webbing and during restraining of the occupant in an emergency situation, such as a vehicle collision. The turning member 140 is generally U-shaped and has a curved surface 142 with a radius large enough to assure that the belt webbing 62 turns smoothly over the turning member. The turning member 140 is supported by the housing 122 to extend at a small acute angle relative to the reference axis A of the seat 20. The angle at which the turning member 140 is disposed relative to the reference axis A assures a smooth turn in the belt webbing 62 with minimal stress and strain as the torso portion 68 of the belt webbing is directed across the bisecting plane P1.

The turning member 140 has openings 146a, 146b (FIG. 6) formed at opposite ends. The openings 146a, 146b receive tabs 148a, 148b formed on the housing 122 to snap attach the turning member 140 to the housing during assembly of the turning mechanism 120. Specifically, during assembly of the turning mechanism 120, the turning member 140 is placed so the rearward openings 146a receive the tabs 148a. The legs of the U-shaped turning member 140 are deflected together slightly and tilted so the forward openings 146b receive the tabs 148b to hold the turning member in the housing 122. Notches 147 in the turning member 140 fit over sides of the housing 122 to block lateral movement of the turning member relative to the housing.

The web guide 128 is then attached to the housing 122 and sheath 100. An upper guide portion 144 of the web guide 124 is curved and located around the curved surface 142 of the turning member 140. The upper guide portion 144 of the web guide 124 engages and is supported by the turning member 140. The upper guide portion 144 of the web guide 124 engages and supports the belt webbing 62. The upper guide portion 144 and turning member 140 direct the belt webbing 62 in a forward direction relative to the seat 20 so the torso portion 68 of the belt webbing extends over an occupant's shoulder. The guide portion 144 of the web guide 124 is made from a material that has a relatively low coefficient of friction so the seat belt webbing 62 slides easily over the guide portion.

The turning mechanism 120 also includes a shield 160 which is supported by the housing 122. The shield 160 is located above the seat belt webbing 62 as it turns over the turning member 140 and guide portion 144 of the web guide 124. The shield 160 cooperates with the sheath 100 and web guide 124 to assure that nothing contacts the belt webbing 62 to bind it or interfere with it in the turning mechanism 120. The shield 160 has tabs 162 which snap attach one portion of the shield to opposite sides of the turning member 140 which are located laterally outboard of the housing 122.

The turning mechanism 120 also includes a cover assembly 180 (FIGS. 3, 5 and 6) which is attached to the housing 122 at a forward location relative to the seat 20. The cover assembly 180 includes a support portion 182, a bezel 184 and a cover 186 which are made from molded plastic.

The support portion 182 snap attaches to the housing 122 and includes a cylindrical portion 200 through which the belt webbing 62 extends. Tangs 202, 204 (FIG. 6) on the housing 122 receive respective expanding push pins 206 and mounting slots 208 on the support portion 182 to attach the support portion to the housing 122. The mounting slots 208 in the support portion 182 are first received over the tangs 204 which extend outward from the housing 122. Stops 210 at ends of the slots 208 engage upper surfaces of the tangs 204 to limit downward movement of the support portion relative to the housing 122. The upper end of the support portion 182 is then rotated slightly rearward so the push pins 206 snap into openings in the tangs 202 to retain the support portion on the housing 122.

The bezel 184 is substantially circular and has an end surface 220 (FIGS. 5 and 6) which is received against an end surface 221 of the cylindrical portion 200 of the support portion 182. The bezel 184 has an arcuate outer surface 188. The cover 186 has resiliently deflectable projections 224 which snap onto receivers 222 on the support portion 182 to retain the cover attached to the support portion and the bezel 184 against the end surface 200 of the cylindrical portion 200. The three lower receivers 222, as viewed in FIG. 6, include support surfaces 225 which support the outer arcuate surface 188 of the bezel 184.

Figure 6:
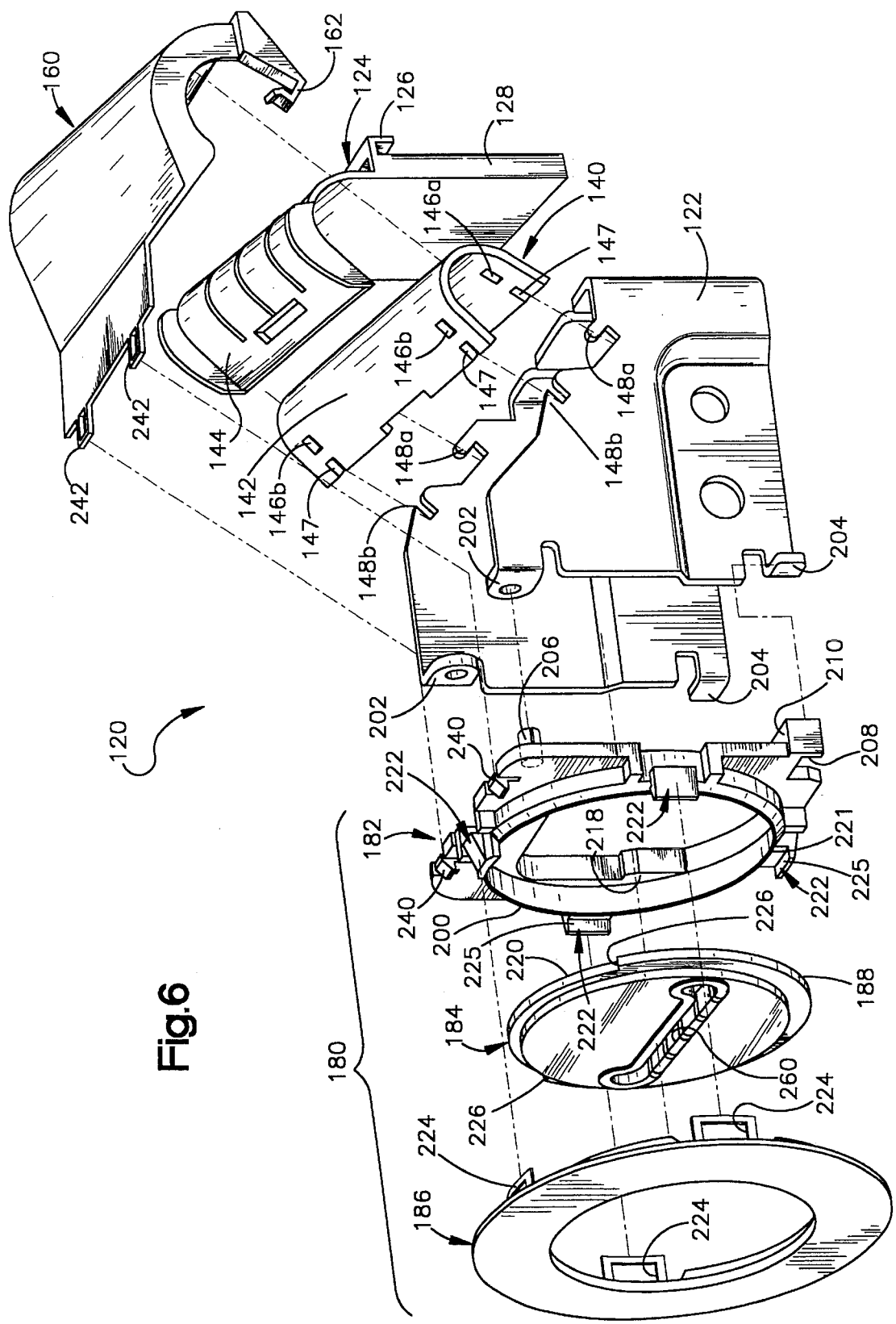
FIG. 6 is an exploded perspective view of the seat belt turning mechanism of the seat belt system FIG. 3.

The bezel 184 is rotatable on the support surfaces 225. The bezel 184 includes radially extending end surfaces 226 which define the limits of the arcuate surface 188. The upper receiver 222, as viewed in FIG. 6, is located closer to an axis R (FIGS. 4 and 5) about which the bezel 184 rotates than the three lower receivers. The end surfaces 226 may engage the upper receiver 222 of the support portion 182 to limit rotation of the bezel in opposite directions relative to the support portion 182.

The support portion 182 also has a snap attachment to connect a forward portion of the shield 160 to the support portion. The support portion 182 includes tangs 240 at an upper end, as viewed in FIG. 6. The tangs 240 are snapped into receivers 242 located on an end of the shield 160. The receivers 242 resiliently deflect when forced downwardly over the tangs 240 to locate and hold the shield 160 relative to the support portion 182 and the housing 122.

The bezel 184 includes a surface which defines a centrally located slot 260. The majority of the slot 260 is located a distance from the reference axis A of the seat 20 which is less than the distance that the majority of the turning member 140 is located from the reference axis. The bezel 184 and the slot 260 are also located forward of the turning member 140 relative to the seat 20.

The torso portion 68 of the belt webbing 62 extends through the slot 260 and engages a portion of the surface which defines the slot as the belt webbing is directed toward the buckle 80. As the seat back 42 is moved relative to the seat 40 or as the occupant moves relative to the seat 20 and depending on the size of the occupant, such as the occupant's height, width and girth, the bezel 184 may be subjected to forces transmitted through the belt webbing 62. The forces act on the slot 260 through the belt webbing 62 and attempt to rotate the bezel relative to the support portion 182.

If the belt webbing 62 applies a greater force near one end of the slot 260, the bezel 184 rotates relative to the support portion 182 and the reference axis A. The surface of the slot 260 supports and smoothly directs the belt webbing 62 from the turning member 140 and web guide 124 comfortably across the shoulder and the torso of the occupant in the seat 20. When the tongue 64 is connected to the buckle 80, the seat belt system 60 can restrain movement of the occupant during an emergency but comfortably allow movement of the occupant relative to the seat 20 in non-emergency situations by the retractor 84 paying out belt webbing 62 and the bezel 184 rotating. The angle at which the turning member 140 is disposed relative to the reference axis A of the seat 20, the location of the slot 260 being closer to the reference axis A than the turning member, and the rotatability of the bezel 182 assure that relatively low amounts of stress are introduced to the belt webbing 62 as the belt webbing is smoothly directed around the turning member and through the slot 260 in the bezel. Further, the turning mechanism 120 can be assembled without tools by snapping components together or without fasteners, such as screws or bolts.

Figure 7:
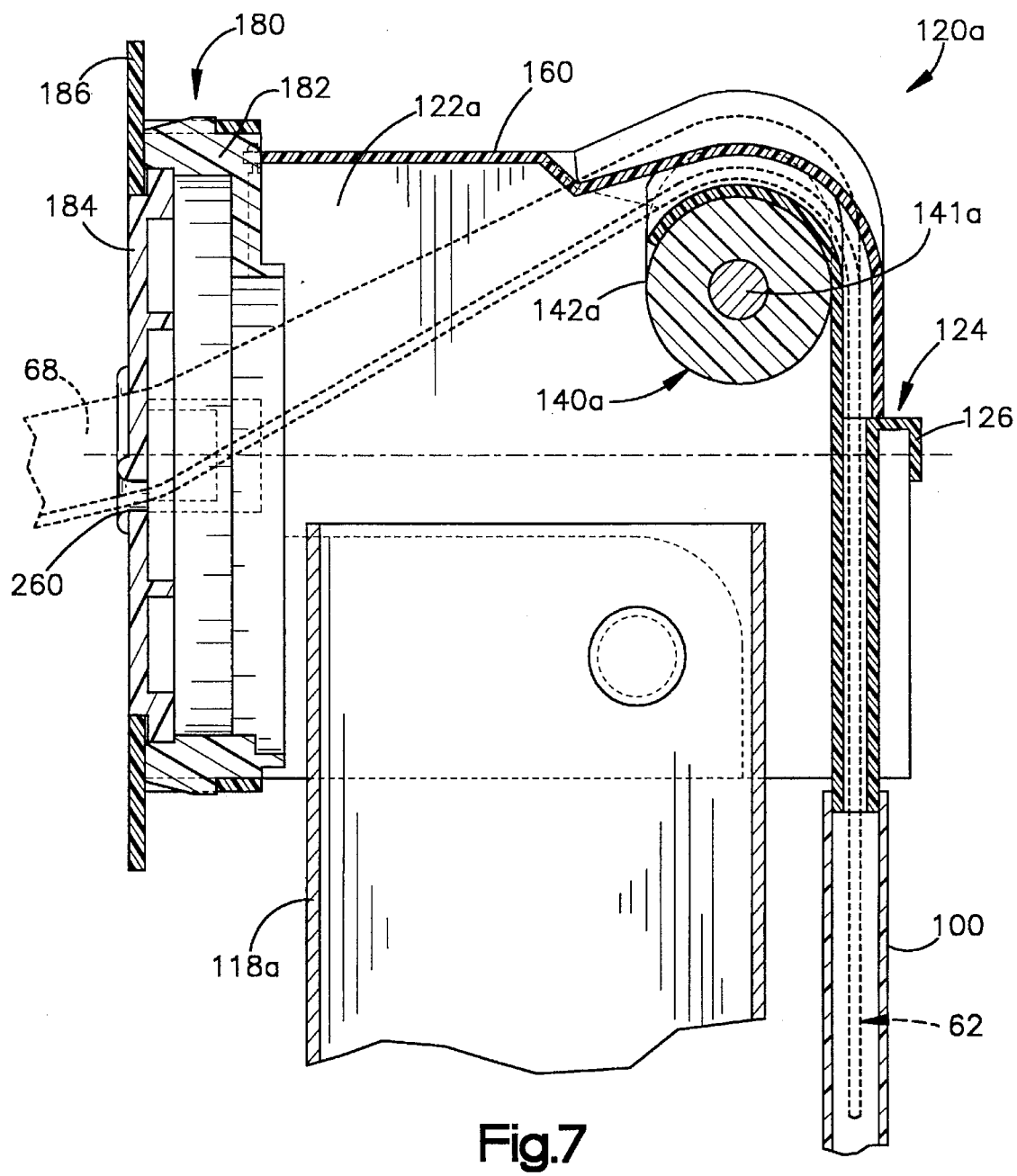
FIG. 7 is an enlarged sectional view of an alternate embodiment of the turning mechanism of the integral seat belt system of FIG. 1.

An alternate embodiment of a turning mechanism 120a is illustrated in FIG. 7. Parts of the turning mechanism 120a which are the same as parts of the turning mechanism 120 (FIGS. 1–6) are given the same reference numerals. Parts of the turning mechanism 120a which are different or modified versions of the corresponding parts of the turning mechanism 120 are given the same reference numerals with a suffix "a".

The turning mechanism 120a is similar to the turning mechanism 120, illustrated in FIGS. 1–6 and described above. The turning mechanism 120a differs slightly from the turning mechanism 120 because a turning member 140a (FIG. 7) is supported by a housing 122a on a central shaft 141a. The turning member 140a includes a cylindrical outer surface 142a. The shaft 141a extends between and is fixed at opposite ends to sides of the housing 122a. The housing 122a is fixed to an end portion of a post 118a. The turning mechanism 120a includes a web guide 124, shield 160 and a cover assembly 180 which are identical to the web guide 124, shield 160 and a cover assembly 180, illustrated in FIGS. 3–6 and described above.

The turning member 140a is angled relative to the reference axis A of the seat 20 in order to assure that relatively low amounts of stress are introduced to the belt webbing 62 as the torso portion 68 of the belt webbing is directed around the turning member and through the slot 260 in the bezel 184.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
 a seat including a frame defining a reference axis and supporting a seat bottom and a seat back;
 a seat belt retractor fixed to said frame;
 seat belt webbing having one end fixed to said frame and another end operably connected with said retractor, said seat belt webbing carrying a tongue between said ends;
 a buckle connected to said frame for receiving and connecting with said tongue;
 guide means located in the seat back for guiding movement of said seat belt webbing through the seat back; and
 a turning mechanism for directing a portion of said seat belt webbing, said turning mechanism comprising:
  a housing fixed to said frame at a location spaced from the reference axis;
  a bezel having a surface supporting said seat belt webbing, said bezel being supported by a portion of said housing for rotation relative to the reference axis; and
  a member having a curved surface and being supported by said housing to extend at an angle relative to the reference axis, said member directing a portion of said seat belt webbing from said guide means toward said surface of said bezel, a majority of said member being spaced from the reference axis a distance greater than a distance that a majority of said surface of said bezel is spaced from the reference axis.

2. The apparatus of claim 1 wherein said guide means further includes a first end portion located adjacent to said seat belt retractor and a second end portion attached to a portion of said turning mechanism.

3. The apparatus of claim 1 wherein said guide means comprises a sheath enclosing a portion of said seat belt webbing which extends between said retractor and said turning mechanism.

4. The apparatus of claim 1 wherein said portion of said housing comprises a support including snap attachment means for attaching said support to said housing and a support surface for receiving said bezel.

5. The apparatus of claim 4 wherein said snap attachment means comprises a surface defining a mounting slot in said support for receiving a portion of said housing and push pin on said support for receipt in an opening in said housing.

6. The apparatus of claim 4 further including a shield to close a portion of said housing, said shield includes second snap attachment means for attaching to a portion of said member of said turning mechanism and third snap attachment means for attaching to a portion of said support.

7. The apparatus of claim 4 further including a cover to retain said bezel on said support surface, said cover including another snap attachment means for attaching to said support.

8. The apparatus of claim 1 wherein the rotational position of said bezel is adjustable relative to the reference axis for said surface defining the slot to direct a portion of said seat belt webbing from said member of said turning mechanism in a direction toward said buckle.

9. The apparatus of claim 1 wherein said seat belt retractor is located in the seat back and said turning mechanism is located outside of the seat back.

10. An apparatus comprising:
 a seat including a frame with a first frame portion supporting a seat bottom and a second frame portion supporting a seat back, said second frame portion connected at two places with said first frame portion, said frame defining a reference axis extending through the two places where said first frame portion connects with said second frame portion, said seat being bisected by a plane extending longitudinally through said seat bottom;
 seat belt webbing including an end fixed to said first frame portion on a first side of the bisecting plane;
 a retractor fixed to one of said first and second frame portions on the first side of the bisecting plane, another end of said seat belt webbing being operably connected with said retractor;
 a tongue carried by said seat belt webbing intermediate said ends;
 a buckle fixed to one of said first and second frame portions on a second side of the bisecting plane, said buckle for receiving said tongue when a portion of said seat belt webbing carrying said tongue is extended across said seat and said tongue is moved from the first side of the bisecting plane to the second side; and
 a sheath located in said seat back, said sheath comprising an elongate tubular member through which said belt webbing extends to guide movement of said seat belt webbing through said seat back; and
 a turning mechanism for directing said seat belt webbing, said turning mechanism comprising:
  a housing fixed to a part of said second frame portion at a location spaced from the reference axis;
  a bezel having a belt slot through which the seat belt webbing extends, said bezel being supported by said housing for rotation relative the reference axis; and
  a member supported by said housing, said member having a curved surface for directing said seat belt webbing from said sheath in a direction toward the belt slot in said bezel, said member extending at an angle relative to the reference axis, and a majority of said member being located a distance from the reference axis which is greater than a distance that a majority of the belt slot in said bezel is spaced from the reference axis.

11. The apparatus of claim 10 wherein the rotational position of said bezel is adjustable relative to the reference axis to enable a surface defining the belt slot to support and direct a portion of said seat belt webbing from said member in a direction toward said buckle.

12. The apparatus of claim 10 wherein said turning mechanism includes a support portion including snap attachment means for attaching said support portion to said housing and a support surface for supporting an arcuate surface of said bezel.

13. The apparatus of claim 12 wherein said snap attachment means comprises a surface defining a mounting slot for receiving a portion of said housing and a push pin having a resiliently deflectable portion for receipt in an opening in said housing.

14. The apparatus of claim 12 further including a shield including second snap attachment means for attaching to a portion of said member and for attaching to said support portion.

15. The apparatus of claim 12 further including a cover to retain said bezel on said support surface of said support portion and third snap attachment means for attaching said cover to said support portion.

16. An apparatus comprising:

a seat including a frame defining a reference axis and supporting a seat bottom and a seat back;

a seat belt retractor fixed to said frame;

seat belt webbing having one end fixed to said frame and another end operably connected with said retractor, said seat belt webbing carrying a tongue between said ends;

a buckle fixed to said frame and for receiving the tongue;

a sheath located in said seat back, said sheath comprising an elongate tubular member through which said belt webbing extends to guide movement of said seat belt webbing through said seat back; and a turning mechanism for directing a portion of said seat belt webbing, said turning mechanism comprising:

a housing fixed to said frame at a location outside of said seat back and adapted to be adjacent to a shoulder of an occupant of said seat;

a support portion and integral snap attachment means for attaching said support portion to said housing, said support portion having a support surface;

a bezel having an arcuate outer surface and a slot through which said seat belt webbing extends, said arcuate outer surface of said bezel being supported by said support surface of said support portion for rotation relative to said housing and the reference axis;

a cover fixed to said support portion by second integral snap attachment means to hold said bezel on said support surface of said support portion; and a member having a curved surface and being supported by said frame, said member directing a portion of said seat belt webbing from said sheath toward said bezel.

17. The apparatus of claim 16 further including a shield having third integral snap attachment means for attaching to a portion of said member and to a portion of said support portion.

18. The apparatus of claim 16 wherein said member extends at an angle relative to a support for said frame.

19. The apparatus of claim 16 wherein the rotational position of said bezel relative to said housing is variable to enable a surface defining the slot to direct seat belt webbing from said member across an occupant of said seat and toward said buckle.

20. The apparatus of claim 16 wherein said sheath includes a first end portion located adjacent said seat belt retractor and a second end portion attached to a portion of said turning mechanism.

* * * * *